June 8, 1965  V. E. PINNELL  3,187,775
FLOW BEAN
Filed Aug. 21, 1961
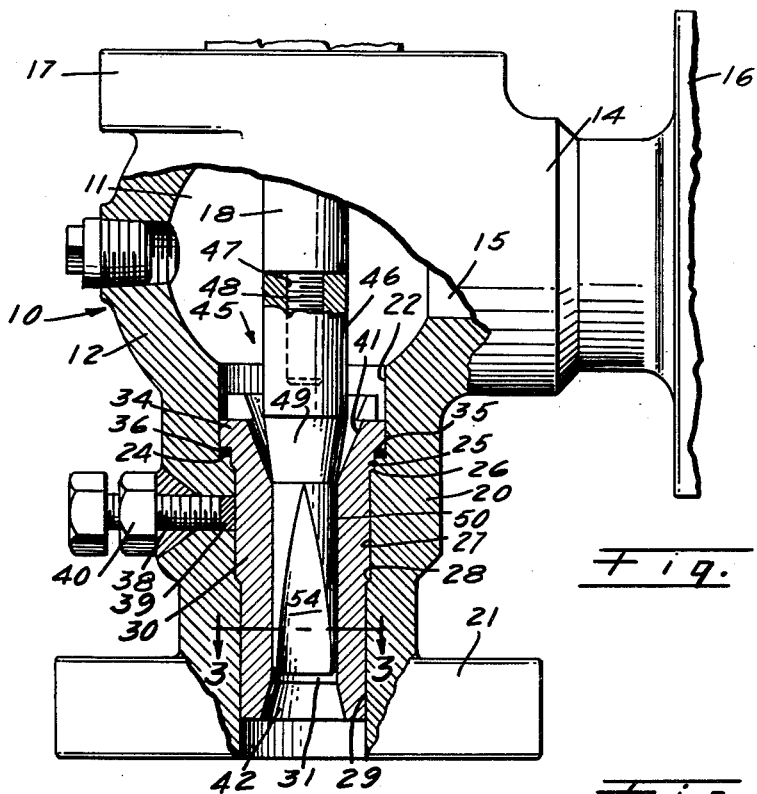
Fig. 1.
Fig. 3.
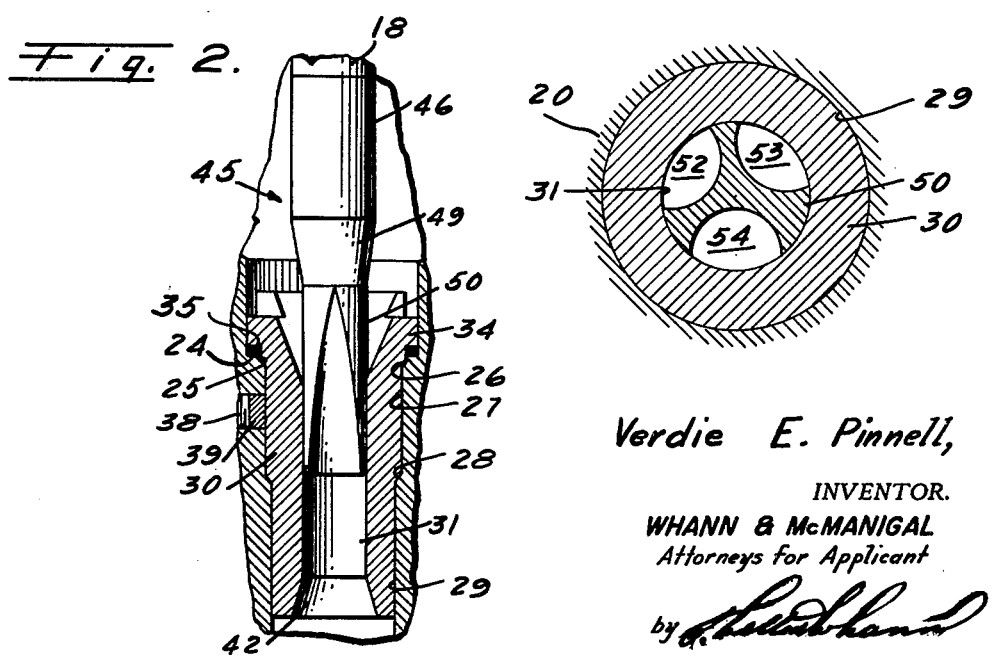
Fig. 2.
Verdie E. Pinnell,
INVENTOR.
WHANN & McMANIGAL
Attorneys for Applicant 3,187,775
FLOW BEAN
Verdie E. Pinnell, Brea, Calif., assignor to Shaffer Tool Works, Brea, Calif., a corporation of California
Filed Aug. 21, 1961, Ser. No. 132,668
11 Claims. (Cl. 137—625.3)

This invention relates generally to valves for the control of fluid flow, and relates more particularly to flow beans.

While the invention has particular utility embodied in adjustable flow beans for use in the oil industry, and is shown and described embodied in such apparatus, it is to be understood that its utility is not confined thereto.

Certain problems and/or difficulties have been encountered in flow beans for controlling the flow of fluid passing through a line and regulating the pressure and the rate of flow thereof, particularly where the pressure of the fluid is high.

One problem has been the difficulty of adjustably turning the movable flow control member under high pressure conditions.

Another difficulty has been the chattering of the flow bean under high pressure and high volume fluid flow conditions.

It is therefore an object of the present invention to provide a flow bean which will solve the above problems and overcome said difficulties.

It is another object of the invention to provide a device of this character which will not chatter.

It is still another object of the invention to provide an adjustable flow bean wherein the adjustable member is relatively easy to turn under high pressure conditions.

A further object of the invention is to provide a device of this character which will level out the flow curve.

A still further object of the invention is to provide a device of this character providing a very accurate control of the fluid flow.

Another object of the invention is to provide a device of this character that is relatively simple in construction and operation.

The characteristics and advantages of the invention are further sufficiently referred to in connection with the following detailed description of the accompanying drawings, which represent one embodiment. After considering this example, skilled persons will understand that many variations may be made without departing from the principles disclosed, and I contemplate the employment of any structures, arrangements, or modes of operation that are properly within the scope of the appended claims.

Referring to the drawings, which are for illustrative purposes only:

FIG. 1 is a side view of a flow bean with portions broken away to show the interior construction and relationship of the parts thereof when the device is in the closed position.

FIG. 2 is a view of a portion of the device showing the adjustable flow control member in the open position; and FIG. 3 is a sectional view taken on line 3—3 of FIG. 1.

Referring more particularly to the drawings, there is shown an adjustable flow bean comprising a body, indicated generally at 10, having a generally spherical chamber 11 defined by walls 12. There is a generally horizontal inlet 14 having an inlet passage 15 therethrough, said inlet 14 having an enlarged annular flange 16 whereby the beam may be attached to the usual conduit.

At the upper end of the body 10 there is a horizontal annular flange 17 to which the usual yoke assembly, not shown, is attached, said yoke assembly including the shaft or stem 18, FIGS. 1 and 2.

The housing 10 includes a depending portion 20 having a horizontal annular flange 21 at the lower end for attachment to a conduit or the like in the usual manner.

The depending portion 20 has a passage therethrough communicating at the upper end with the chamber 11 and terminating at the lower end of said depending portion. This passage through the depending portion 20 comprises an upper part 22 having an inwardly extending annular shoulder 24 normal to the axis of the passage through the depending portion or part 20 of the bean.

From the inner edge of the shoulder 24 there is a depending reduced diameter part 25 and at the lower end of the part or portion 25 there is an inwardly and downwardly inclined shoulder 26. From the inner edge of the sloping shoulder 26 there is a further reduced diameter part 27 which also has, at its lower end, a downwardly and inwardly tapering shoulder 28. From the inner edge of the shoulder 28 there is a lower passage portion 29. It will be noted from the foregoing that the passage through the depending part 20 of the bean is stepped with the portions thereof successively smaller in diameter from top to bottom, said passage being axially aligned with the stem 18.

Within the passage through the depending portion 20 of the device there is an insert 30 having an axial passage 31 therethrough termed the orifice. The insert has portions with external diameters corresponding to the internal diameters of the various parts of the vertical passage through the portion 20 of the flow bean. It is to be noted that at the upper end of the insert there is a flange 34 having an external diameter substantially the same as the internal diameter of the passage portion 22 and at the lower end of the flange 34 there is a shoulder 35 which is normal to the axis of the insert. Between the shoulders 35 and 24 there is a fluid seal 36.

The insert 30 is secured in the depending portion 20 by any suitable means such as, for example, the screw 38 which is received in a tapped opening provided therefor in the wall of the depending portion 20, there being a plug 39 slidably disposed in the tapped opening for the screw 38 and positioned between the inner end of said screw and the adjacent exterior wall of the insert. A locknut 40 is provided on the screw 38 for securing same against inadvertent turning.

It is to be noted that the upper end of the passage 31 flares upwardly and outwardly while there is a downwardly and outwardly flared portion 42 at the lower end.

Control of fluid flow through the orifice 31 is effected by a tip, indicated generally at 45. Tip 45 includes a base 46 having a tapped bore 47 extending from the upper end thereof and threadably receiving an externally threaded reduced diameter stud 48 which extends downwardly from the lower end of the stem 18. Thus the tip 45 is removably attached to the stem 18. The opposite end of the base 46 is tapered inwardly and downwardly at 49, as shown in the drawings, the part 49 being of frusto-conical shape. From the smaller end of the part 49 there extends a part 50 which is snugly but slidably received in the orifice 31. Part 50 is provided with a plurality of longitudinally extending V-shaped grooves with their apices at the upper end of the portion 50 adjacent the junction thereof with the part 49. Three grooves are provided and are indicated at 52, 53 and 54, respectively. It is to be noted that the adjacent grooves 52 and 53 are of the same size, while groove 54 is somewhat deeper and wider and hence somewhat larger than said grooves 52 and 53.

Flow through the orifice 31 is controlled by the tip 45 and particularly by the reduced diameter portion 50. When the tip is in the lower position, shown in FIG. 1, the grooves 52, 53 and 54 are disposed within the orifice 31 to thereby shut off fluid flow through the orifice, the tapered portion 49 engaging the lower end of the seat 41 of the insert to provide additional shut off means.

When the tip 45 is raised by the usual yoke assembly mechanism flow through the orifice is determined by the position of the reduced diameter of flow control or regulating portion 50. It will be obvious that as the tip is moved upwardly the grooves 52, 53 and 54 have greater areas into which fluid may flow from the upper end of the passage through the portion 20 of the bean, due to the flared shape of said grooves.

The portion 50 of the tip has a close tolerance with the orifice 31 and flow through the deeper, larger groove 54 forces the portion 50 toward and against the opposite cylindrical wall part of the orifice and thereby prevents vibration and chattering of the tip.

This arrangement makes it easy to turn the mechanism under high pressure conditions, levels out the flow curve and gives an extremely accurate control.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely for purposes of illustration.

I claim:

1. A flow bean, comprising: a hollow body including a depending tubular part provided with an annular flange at the free end thereof and a laterally extending tubular inlet having an annular flange at the free end thereof; an insert in the depending part, said insert having an axially extending outlet orifice passage with flared end portions, the upper flared portion comprising a seat; means releasably securing the insert in said depending portion of the body; bean tip actuating means, including an axially movable stem extending into the body from the upper end thereof in axial relationship to said orifice passage; and a flow bean tip axially arranged relative to said stem, said tip having an inwardly tapering frusto conical portion, and a flow control portion extending from the smaller end of said tapering portion and slidably but snugly and fully received in said orifice passage when the bean is closed, said control portion having three generally V-shaped, concave grooves spaced uniformly and annularly apart from each other with the apices at the junction of the tapered portion and said control portion, said grooves increasing in effective size lengthwise from the apices thereof, one of said grooves being somewhat deeper and hence somewhat larger than the other grooves, the tapered portion of the tip seating at the upper end of the orifice passage through the insert.

2. A flow bean, comprising: a hollow body including a depending tubular part, and a laterally extending tubular part; an insert in the depending part, said insert having an axially extending outlet orifice with flared end portions; means releasably securing the insert in said depending portion of the body; an axially movable stem extending into the body from the upper end thereof in axial relationship to the orifice of said insert; and a flow bean tip axially arranged relative to said stem and secured thereto, said tip having an inwardly tapering frusto conical portion, and a flow control portion extending from the smaller end of said tapering portion and slidably but snugly received in said orifice, said control portion in the orifice having three generally V-shaped grooves, concave in cross section, spaced uniformly and annularly apart from each other with the apices at the junction of the tapered portion and the control portion, said grooves increasing in effective size lengthwise from the apices thereof, one of said grooves being somewhat deeper and wider and hence somewhat larger than the other grooves.

3. In a flow bean: a hollow body including a depending tubular part, and a laterally extending tubular part; there being an elongated orifice in said depending part; a flow bean tip axially arranged relative to said orifice, said tip having a control portion slidably but snugly received in said orifice, said control portion having three generally V-shaped grooves spaced uniformly and annularly apart from each other with the apices located at the upper end of said control portion, said grooves increasing in effective width and depth lengthwise from the apices thereof, one of said grooves being somewhat wider than the other grooves.

4. In a flow bean: a hollow body including a depending tubular part, and a laterally extending tubular part, there being an elongated orifice in said depending part; a flow bean tip axially arranged relative to said orifice, said tip having a cylindrical control portion slidably but snugly received in said orifice, said control portion having a plurality of generally V-shaped grooves spaced annually apart from each other with the apices located at the upper end of said control portion, said grooves increasing in effective size lengthwise from the apices thereof, one of said grooves being somewhat wider than the other grooves.

5. In a flow bean: a hollow body including a depending tubular part, and a laterally extending tubular part, there being an elongated orifice in said depending part; and a flow bean tip having a control portion slidably but snugly received in said orifice, said control portion having a plurality of grooves extending from the free inner end of said control portion and spaced annularly apart from each other, said grooves being of equal length and increasing in effective size lengthwise from one end thereof, one of said grooves being somewhat larger than the other grooves.

6. In a flow bean: a hollow body including a depending tubular part, and a laterally extending tubular part, there being an elongated orifice in said depending part; a flow bean tip having a control portion slidably but snugly received in said orifice, said control portion having three longitudinally extending grooves of equal length spaced annularly apart from each other, said grooves increasing in effective size lengthwise from one end thereof, one of said grooves being somewhat larger than the other grooves.

7. A flow bean tip comprising: a cylindrical end part having a tapped bore extending axially from one end; a frusto conical portion extending axially from the other end of said cylindrical part with the larger diameter end connected to said other end of said cylindrical part, and a cylindrical control part extending from the smaller end of said tapering portion, said control part having three generally V-shaped grooves spaced uniformly and annularly apart from each other with the apices at the junction of the tapered portion and the control part, said grooves increasing in effective size lengthwise from the apices thereof, one of said grooves being somewhat deeper and hence somewhat wider than the other grooves.

8. A flow bean tip comprising: a cylindrical base from one end of which extends an inwardly tapering frusto conical portion; and a flow control part extending from the smaller end of said tapering portion for slidable but snug operative reception in an orifice, said control part having three generally V-shaped grooves, concave in cross section, spaced uniformly and annularly apart from each other with the apices at the junction of the tapered portion and the control part, said grooves increasing in effective size lengthwise from the apices thereof, one of said grooves being somewhat deeper and wider and hence somewhat larger than the other grooves.

9. In a flow bean tip: a cylindrical control part having three generally V-shaped grooves spaced annularly apart from each other with the apices adjacent one end of said control part, said grooves being of equal length and increasing in effective size lengthwise from the apices thereof, one of said grooves having a greater effective pressure area than the other grooves.

10. In a flow bean tip: a hollow body having a cylindrical control portion, said control portion having a plurality of generally V-shaped grooves spaced annularly apart from each other with the apices adjacent one end of said control portion, said grooves being of equal length and increasing in effective size lengthwise from the apices thereof, one of said grooves having a greater effective pressure area than the other grooves.

11. In a flow bean tip: a control portion, said control portion having a plurality of longitudinally extending grooves spaced annularly apart from each other, said grooves being equal length and increasing in effective size lengthwise from one end thereof, one of said grooves having a somewhat greater pressure area than the other grooves.

References Cited by the Examiner

UNITED STATES PATENTS

| | | | |
|---|---|---|---|
| 70,919 | 11/67 | Tucker | 137—625.3 |
| 1,390,897 | 9/21 | Flory | 137—625.3 X |
| 2,014,314 | 9/35 | Defenbaugh | 251—122 |
| 2,980,392 | 4/61 | Greenwood | 251—210 |

M. CARY NELSON, *Primary Examiner.*

MARTIN P. SCHWADRON, LAVERNE D. GEIGER,
*Examiners.*